United States Patent [19]

Gosswiller

[11] Patent Number: 4,488,209
[45] Date of Patent: Dec. 11, 1984

[54] PORTABLE LIGHTING APPARATUS

[75] Inventor: Earl W. Gosswiller, Clarendon Hills, Ill.

[73] Assignee: Federal Signal Corporation, Oak Brook, Ill.

[21] Appl. No.: 527,034

[22] Filed: Aug. 29, 1983

[51] Int. Cl.³ .............................................. B60Q 1/06
[52] U.S. Cl. ..................................... 362/386; 362/74; 362/80; 362/190; 362/191; 362/250; 362/269; 362/272; 362/273; 362/275; 362/285; 362/286; 362/287; 362/289; 362/396; 362/419; 362/427; 362/428; 362/430; 362/431; 248/422
[58] Field of Search ............... 362/74, 80, 190, 191, 362/250, 269, 272, 273, 275, 285, 286, 287, 289, 396, 419, 427, 428, 430, 431, 386; 248/422

[56] References Cited
U.S. PATENT DOCUMENTS 4,300,186 11/1981 Hurd .............................. 362/431 X Primary Examiner—Stephen J. Lechert, Jr.
Attorney, Agent, or Firm—Charles F. Pigott, Jr.

[57] ABSTRACT

A portable lighting apparatus having a lamp assembly attached to the top of an elongated mast, preferably formed of interconnectable relatively short sections. The lamp assembly includes at least one electric lamp affixed to a horizontal shaft for rotation about a horizontal axis. Associated with the horizontal shaft are a pair of gears, suitably a vertical rack and a pinion engaged therewith, the pinion being operatively attached to the horizontal shaft. A spring associated with the pinion tends to rotate the gear in a direction which biases the engaged rack downwardly. The lower end of the rack abuts a movable pushrod generally centrally located within the hollow mast and running the length thereof. The lower end of the mast is telescopically mounted on a mast support provided with a fixed vertical stoprod which abuts the lower end of the pushrod. Vertical movement of the lower end of the mast relative to the mast support causes vertical movement of the rack which in turn rotates the engaged pinion and the horizontal shaft on which the lamp is mounted, thus permitting any desired elevational angle of the lamp to be obtained. Similarly, rotation of the entire mast relative to the mast support permits adjustment of the apparatus in azimuth to be made as desired. When the desired position of the lighting apparatus is obtained, the apparatus is fixed by means of a clamp which clamps the lower end of the mast to the mast support.

10 Claims, 7 Drawing Figures

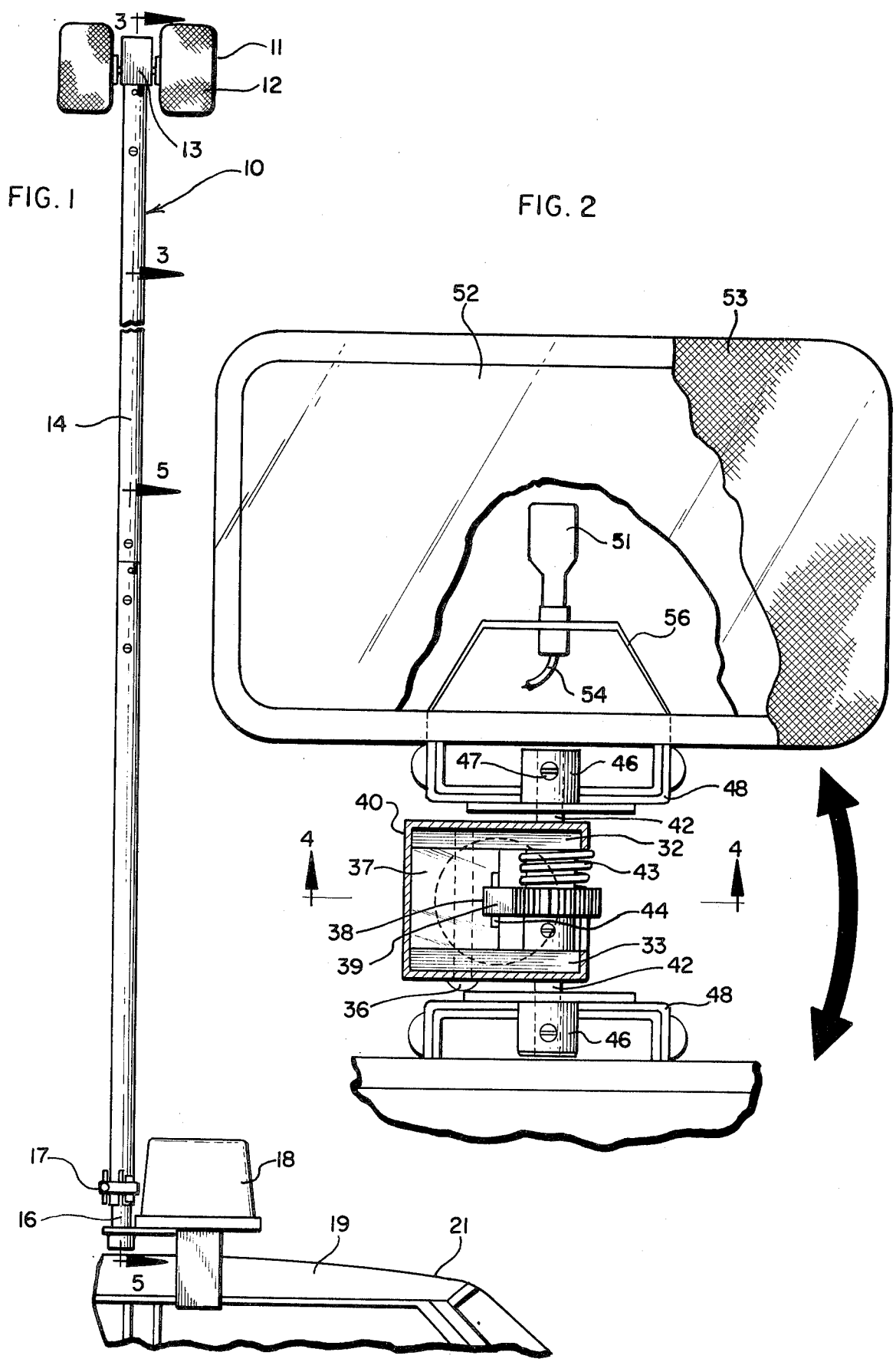

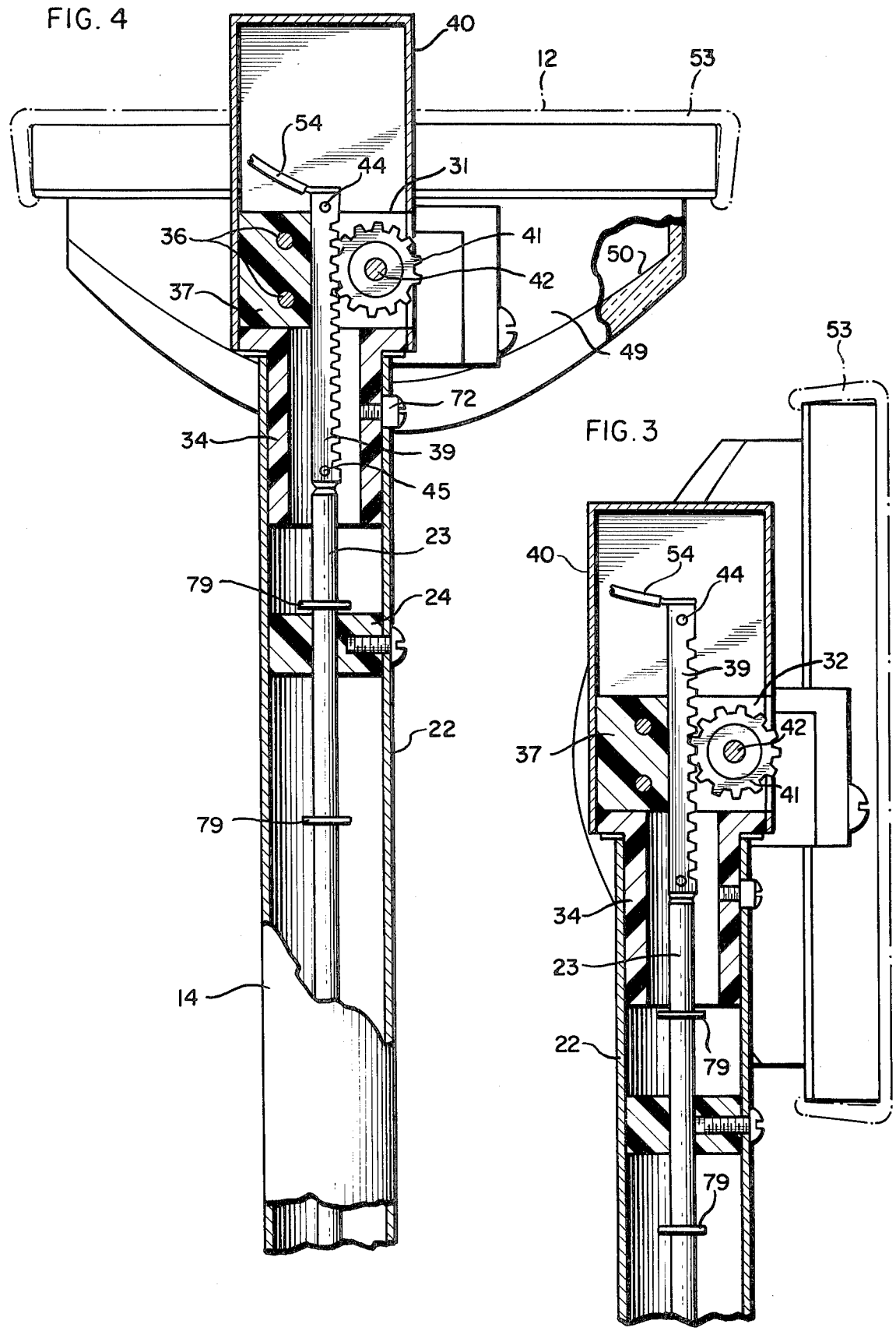

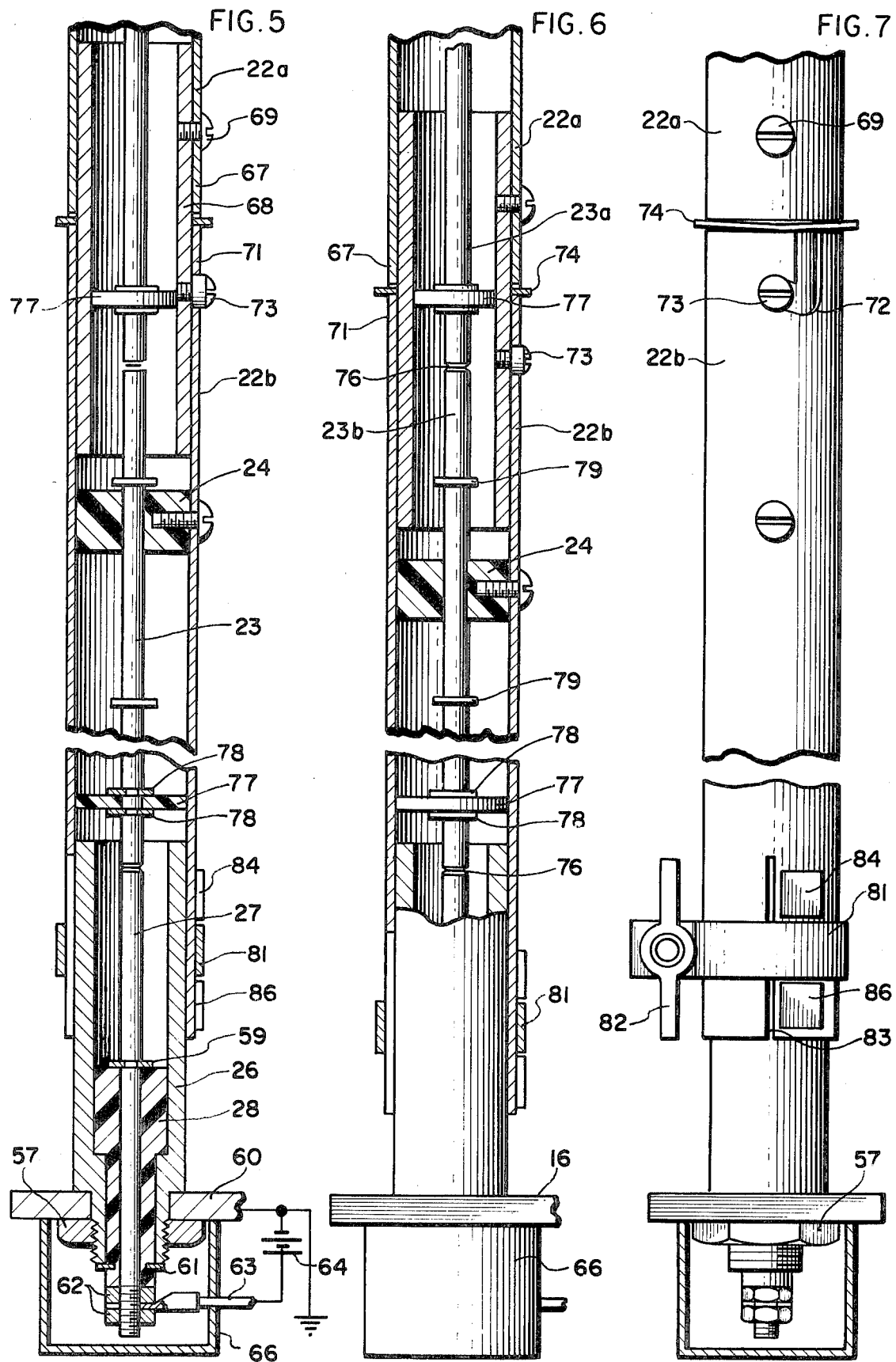

PORTABLE LIGHTING APPARATUS

This invention relates to a portable lighting apparatus suitable for use on a vehicle for providing emergency lighting when needed, e.g., at the site of an accident.

BACKGROUND OF THE INVENTION

A portable lighting apparatus useful for use in illuminating the scene of an automobile accident or other emergency at night or for providing light needed for repair or emergency work in unlighted outdoor locations desirably should have a number of features. The lamp assembly should be capable of being mounted at a substantial distance above the ground in order to increase the area of illumination to permit directing the light over intervening vehicles or other objects and to reduce the amount of glare directed into the eyes of oncoming motorists. Moreover, the light should be controllable both in elevation and azimuth so as to be easily reoriented as needed. In addition, it should be readily erected and dismantled, preferably into relatively small sections to facilitate storage in a vehicle such as a police car or ambulance, when not in use.

BRIEF DESCRIPTION OF THE INVENTION

In accordance with the invention, there is provided a portable lighting apparatus having a lamp assembly attached to the top of an elongated mast, preferably formed of interconnectable relatively short sections. The lamp assembly includes at least one electric lamp affixed to a horizontal shaft for rotation about a horizontal axis. Associated with the horizontal shaft are a pair of gears, suitably a vertical rack and a pinion engaged therewith, the pinion being operatively attached to the horizontal shaft. A spring associated with the pinion tends to rotate the gear in a direction which biases the engaged rack downwardly. The lower end of the rack abuts a movable pushrod generally centrally located within the hollow mast and running the length thereof. The lower end of the mast is telescopically mounted on a mast support provided with a fixed vertical stoprod which abuts the lower end of the pushrod. Vertical movement of the lower end of the mast relative to the mast support causes vertical movement of the rack which in turn rotates the engaged pinion and the horizontal shaft on which the lamp is mounted, thus permitting any desired elevational angle of the lamp to be obtained. Similarly, rotation of the entire mast relative to the mast support permits adjustment of the apparatus in azimuth to be made as desired. When the desired position of the lighting apparatus is obtained, the apparatus is fixed by means of a clamp which clamps the lower end of the mast to the mast support.

Electrical energy can be supplied to the lamp in any suitable manner, e.g., by the use of an external power cable. In a preferred embodiment of the invention, however, the pushrod and the rack are made electrically conducting and electrically insulated from the electrically conducting mast. The pushrod and gear then serve as one conductor for supplying power to the lamp, the mast serving as the return conductor. In this way, external power cables can be eliminated.

DESCRIPTION OF THE DRAWINGS

The invention will be better understood from the detailed description which follows, taken in conjunction with the accompanying drawings, in which:

FIG. 1 is a front elevational view of lighting apparatus in accordance with the invention including two lamps positioned to provide a horizontal beam, the apparatus being attached to the base of a conventional warming light/sound system affixed to the roof of a vehicle;

FIG. 2 is a partial top view of the upper end of the apparatus of FIG. 1, with the lamps rotated through an angle of 90° to provide a vertical beam;

FIG. 3 is a sectional view along the lines 3—3 of FIG. 1;

FIG. 4 is a view similar to that of FIG. 3 with the lamps rotated to the position shown in FIG. 2;

FIG. 5 is a sectional view along the line 5—5 of FIG. 1 when the lamps are in the position shown in FIG. 4;

FIG. 6 is a view similar to FIG. 5, showing the mast in a lower position relative to the mast support, with the lamps in the position shown in FIG. 3; and FIG. 7 is a right side view of FIG. 5.

DETAILED DESCRIPTION

As shown in FIG. 1, the lighting apparatus 10 of the invention comprises four subassemblies or parts as follows: (A) a lamp assembly 11 including one or more electric lamps 12 mounted on (B) a lamp position control assembly 13 affixed to the top of (C) a mast assembly 14, the lower end of which is connected to a mast support 16 by means of (D) a clamp assembly 17 which permits orientation of the lighting apparatus as desired. As shown, mast support 16 is itself connected to a conventional warning light/sound system 18 affixed to the roof 19 of an automobile or similar vehicle 21.

As hereinafter described, the elevation of the beam produced by lamps 12 in lamp assembly 11 can be controlled over 180° (or more if desired), from a vertically upward direction to a vertically downward direction, by appropriate vertical positioning of the lower end of mast assembly 14 relative to mast support 16. The orientation of lamp assembly 11 in azimuth can be adjusted by loosening clamp assembly 17 and rotating mast assembly 14 to the desired direction.

As shown in FIGS. 3-6, mast assembly 14 comprises a vertical tubular mast 22, preferably formed of an electrically conducting material such as aluminum or steel, provided with a centrally located pushrod 23, also preferably electrically conducting, the pushrod being substantially coextensive in length with the mast and vertically movable therein. Mast 22 is suitably provided with internal bearings 24, preferably electrically insulating, which maintain pushrod 23 in its central location and permit vertical movement thereof while electrically insulating the pushrod from the mast.

Mast support 16 comprises a relatively short tubular post 26 adapted to enter telescopically the open lower end of mast 22. The mast support also includes a relatively short, fixed vertical stoprod 27 concentrically located within tubular post 26 in position to abut the lower end of pushrod 23. Stoprod 27 is also preferably electrically conducting and electrically insulated from post 26 by insulator 28 suitably formed of a synthetic plastic or other insulating material.

Lamp position control assembly 13 mounted to the top end of mast assembly 14 (see FIGS. 2-4) includes a yoke 31 having two spaced arms 32 and 33 and a lower tubular portion 34 adapted to enter the upper open end of mast 22. Held between the arms 32,33 of yoke 31 by appropriate means, e.g., screws 36, is a bearing block 37, preferably formed of an insulating material, provided with a vertical notch 38 in its inner face within which is positioned a vertical rack 39, preferably electrically conducting, engaging a pinion 41 mounted on a shaft 42 supported for rotation about a horizontal axis by arms 32 and 33 of yoke 31. Pinion 41 is preferably insulating while shaft 42 is electrically conducting and in electrical contact with yoke 31 which is also preferably electrically conducting. Concentrically mounted on shaft 42 is a coil spring 43 having one end fixed relative to yoke 31 and the other end operatively connected to pinion 41. Housing 40 encloses the position control assembly for protection against the weather.

The configuration of spring 43 is such as to tend to rotate pinion 41 in a direction to bias rack 39 downwardly. To limit the travel of rack 39, it is provided at its upper and lower ends with transverse stop pins 44 and 45 which strike the upper and lower horizontal surfaces of bearing block 37 to prevent further downward or upward travel of the pinion, respectively.

A lamp 12 is attached to at least one of the outer ends of shaft 42 by appropriate means, e.g., a collar 46 and set screw 47 attached to bracket 48 affixed to the case 49 of lamp 12. Lamp 12, which is conventional in construction, suitably includes an inner polished surface 50, preferably parabolic, an incandescent lamp 51, a clear lens 52, and a removable clip-on diffusion lens 53 for producing a wide-angle beam when desired. In conventional fashion, power for incandescent lamp 51 is provided through a single conductor 54 (FIG. 2), the circuit being completed in an appropriate conventional manner, e.g., through conducting mounting bracket 56 attached to case 49 of lamp 12.

Rack 39 is centrally located within yoke 31 and accordingly is collinear with pushrod 23 within mast assembly 14. Because of the downward biasing action of spring 43, the lower end of rack 39 moves downwardly until it abuts the upper end of pushrod 23, making, in the preferred embodiment of the invention, electrical contact therewith. In the preferred embodiment, there is attached to the upper end of electrically conducting rack 39, one end of a flexible electrical single conductor 54, the other end of which, by any appropriate pathway (not shown), serves as the "hot" conductor for supplying power to incandescent lamp 51, as previously described.

In order to permit excitation of incandescent lamp 51 through pushrod 23 and rack 39 as described, the lower end of mast support post 26 is provided with appropriate electrical connections, as shown in FIG. 5. Support post 26 is held in place in mounting plate 60 by means of nut 57 which assures electrical conductivity between support post 26 and plate 60. Central insulator 28 is held in position within support post 26 by means of upper retaining ring 59 affixed to stoprod 27 and lower removable spring clip 61 which abuts the threaded lower end of support post 26. Affixed to the threaded lower end of stoprod 27 by means of nuts 62 is "hot" conductor 63 leading to battery 64, the other side of which is grounded, e.g., to the vehicle body. The joint assembly is suitably covered by a protective housing 66 affixed to plate 60 by any suitable means.

Although mast 22 may consist of a single piece of metallic tubing of appropriate length, it is preferred to form it of detachable sections which can be assembled and disassembled on the site. For such use, the invention provides individual mast sections, e.g., 22a,b, FIG. 5-7, each of which is provided with a movable central pushrod of corresponding length. The lower end 67 of upper section 22a is provided with a tubular coupling 68 held in place by suitable means, e.g., screw 69. The lower end of coupling 68, which protrudes beyond the lower end of upper section 22a is telescoped into the upper end 71 of lower section 22b. The mast sections are joined by engagement of a J-shaped slot 72 in the wall of section 22b (FIG. 7) with engaging screw 73 affixed to the wall of tubular coupling 68. Spring washer 74 interposed between the mating ends of mast sections 22a and 22b provides sufficient resilient force to maintain the mast sections together and also to insure good electrical contact therebetween.

Each of mast sections 22a and 22b is provided with a pushrod section, i.e., 23a and 23b respectively, of generally equal length, the opposing ends of which abut to form electrical connections, e.g., 76.

Insulating bearings 24 within the main body of each of the mast sections permit vertical movement of the pushrod sections therein while maintaining electrical insulation. Within coupling 68 and elsewhere as appropriate, an insulating washer 77 of appropriate diameter is fixed to pushrod 23 by retaining rings 78 and moves with the rod.

In order to limit the movement of a pushrod section, e.g., 23a, within a mast section, e.g., 22a, the pushrod sections are provided with fixed stop rings 79 located on opposite sides of bearings 24.

Attachment of mast assembly 14 to support post 26 is accomplished by means of circular clamp 81 and thumb screw 82, encircling the lower end of the mast, which is provided with a vertical slot 83 for resiliency as well as clamp guides 84 and 86.

It will be seen that vertical movement of the lower end of mast assembly 14 on support post 26 will cause stoprod 27, against which the lower end of pushrod 23 is maintained by the biasing action of spring 43, to cause the pushrod to move vertically relative to mast 22. Relative vertical movement of the pushrod also causes vertical movement of rack 39 and rotational movement of pinion 41 engaged therewith. Rotation of pinion 41 causes rotation of shaft 42 and lamp assembly 11 attached thereto through bracket 48. Accordingly, the angle of elevation of the lamp assembly can be controlled by adjusting the position of the lower end of the mast assembly on the support. Similarly, the entire mast assembly can be rotated on mast support 16 and clamped by thumb screw 82 at the desired azimuth location.

It will also be seen that by using the electrically conducting pathway consisting of the stoprod 27, pushrod 23 and rack 39 as one side of the power supply circuit and the similarly conducting (but electrically insulated from the pushrod circuit) path consisting of mounting brackets 48 and 56, shaft 42, yoke 31 and mast 22 as the return side, the lighting apparatus of the invention is free of any external wires which can tangle or bind. It should be understood, however, that an external power cable leading directly to the lamp can be used if so desired.

When the lighting apparatus of the present invention is actually mounted in operative position on the support post 26 and stop rod 27 as shown in FIG. 5, the relative movement between the push rod 23 and mast 22 is provided by vertical movement of the mast with respect to the push rod which does not move vertically but remains engaged against stop rod 27. Thus, it will be understood that rotation of the lamp assembly 11 together with lamp shaft 42 in order to aim the lamp up or down is controlled by vertical movement of the mast 22 relative to the fixed support post 26. As the mast 22 is raised, the housing 40, shaft 42 and pinion 41 are raised relative to the rack 39 and push rod 23, thereby causing the pinion to move to the upper end of the rack toward the position shown in FIG. 4. Moreover, the spring 43 biases the pinion 41 to cause it to rotate in a direction where it climbs up the rack 39. When an operator pulls down on the lower end of the mast 22 relative to the fixed support post 26, the pinion 41 is forced to rotate downwardly along the rack 39 to a position such as shown in FIG. 3 causing rotation of the lamp assembly on lamp shaft 42 to a different desired position, and as described herein the mast 22 may be clamped in any desired vertical position relative to support post 26 by the clamp member 81. It will be noted that in the preferred embodiment shown herein the push rod 23 and rack 39 do not move vertically, but of course there is relative vertical movement between the rack 39 and push rod 23 on the one hand and the mast 22 and pinion 41 on the other hand. It will also be noted that because the pinion 41 is biased in a counterclockwise direction as viewed in FIGS. 3 and 4, there is always a downward force on the rack 39 and the various push rod sections 23 to cause them to be engaged against one another in vertical compression.

The foregoing detailed description has been given for clearness of understanding only and no unnecessary limitations should be understood therefrom as modifications will be obvious to those skilled in the art.

What is claimed is:

1. Portable lighting apparatus for mounting on a vehicle and providing a light source at a height substantially elevated above the vehicle, said apparatus comprising, in combination, a mast assembly comprising at least one vertical tubular mast section, mast support means for supporting said mast assembly from its lower end, a push rod located within said mast and substantially coextensive in length therewith, push rod support means associated with said mast support means for vertically supporting the lower end of said push rod, an electric lamp assembly mounted on the upper end of said mast, said lamp assembly including at least one lamp mounted on a generally horizontal lamp shaft for rotation therewith, vertical rack means supported on the upper end of said push rod, and pinion gear means mounted on said lamp shaft for conjoint rotation with said lamp assembly about a generally horizontal axis, said lamp assembly and pinion gear being vertically movable with said mast, whereby manual vertical movement of said mast relative to said mast support will effect movement of said pinion gear along said rack thereby rotating said lamp assembly to a desired position.

2. Portable lighting apparatus as defined in claim 1 including spring means for biasing said pinion gear to rotate in a direction which causes said gear to climb up said rack thereby urging said rack downwardly against said push rod.

3. Portable lighting apparatus as defined in claim 1 where said push rod support means comprises a fixed vertical stop rod located within said mast support means, and said mast support means comprises a vertical generally tubular mast support adapted to enter telescopically into the lower open end of said mast.

4. Portable lighting apparatus as defined in claim 1 including releasable clamp means for clamping the lower end of said mast in a desired vertical position relative to said mast support means to control both the aximuth of said lamp assembly and its rotational position relative to said generally horizontal axis.

5. Portable lighting apparatus as defined in claim 1 where said push rod and said rack are electrically conductive and are insulated from said mast, and where said push rod is connected to a source of electric power so as to conduct electric current to said lamp assembly.

6. Portable lighting apparatus as defined in claim 1 including electrically insulating bearing means within sid mast for guding the movement of said mast relative to said push rod.

7. Portable lighting apparatus as defined in claim 3 where said fixed vertical stop rod is electrically conductive and is connected to a power source for supplying electric current to said lamp assembly through said push rod and said rack.

8. Portable lighting apparatus as defined in claim 5 where said mast is utilized to provide a ground return side of the electric circuit for said lamp assembly.

9. Portable lighting apparatus as defined in claim 1 where said mast assembly comprises a plurality of individual mast sections each of which includes a centrally located movable push rod section adapted to abut the corresponding push rod section in an adjacent mast section, said mast sections being provided at their ends with releasable interconnecting means for assembling said sections into a unitary structure.

10. Portable lighting apparatus as defined in claim 9 where each of said mast sections contains electrically insulating bearing means for guiding the relative movement between each mast section and its corresponding push rod section, and each push rod section having stop means which interact with said bearing means to limit the extent of longitudinal relative movement between each mast and push rod section.

* * * * *